United States Patent [19]

Liou

[11] 4,272,896
[45] Jun. 16, 1981

[54] EDUCATIONAL TOY

[76] Inventor: Sydarsis Liou, No. 137, Chung Shan Rd., Chuou Lan Town, Miao Li Hsien, Taiwan

[21] Appl. No.: 43,829

[22] Filed: May 30, 1979

[51] Int. Cl.³ .............................................. G09B 7/00
[52] U.S. Cl. ................................................... 434/340
[58] Field of Search .................. 35/9 D, 9 C; 46/145, 46/146, 26 S

[56] References Cited

U.S. PATENT DOCUMENTS

| 3,795,063 | 3/1974 | Nelson | 35/9 D |
| 3,902,256 | 9/1975 | Liu | 46/26 S |

Primary Examiner—Peter Chin

[57] ABSTRACT

An educational toy comprising a frame structure provided with two compartments for separately receiving each one of a series of selective quiz and answer boards, a flexible channel bar having a plurality of selective electrical connections, and two mechanisms to show whether the answer is affirmative or negative when an answer board is placed to match a corresponding quiz board via said flexible channel bar.

7 Claims, 7 Drawing Figures

EDUCATIONAL TOY

The present invention relates to an educational toy.

Various kinds of educational toys have been proposed. In the U.S. Pat. No. 3,902,256 for example, there is provided an educational quiz and answer toy comprising a base portion, an active statue portion mounted on the base, a compartment for receiving a quiz plate, a compartment for receiving an answer plate, electrical connections implanted in both the cavity and plates, the toy being arranged such that when a correct answer plate is inserted to match a corresponding quiz plate, the circuit is closed to move a motor actuated crank mechanism within the statue to cause the statue to nod its head and clap.

The object of the present invention is to provide an educational toy having a different operational function and improved structure over the afore-mentioned U.S. Pat. No. 3,902,256.

According to the present invention, there is provided an educational toy comprising a frame structure having two compartments for separately receiving each one of a series of selective quiz and answer boards, a flexible like bar having a plurality of selective electrical connections, and two mechanisms to show whether the answer is affirmative or negative when an answer board is placed to match a corresponding quiz board via said flexible channel bar.

Other objects and advantages will become apparent from the following description with reference to the accompanying drawings, in which.

Figure 1:
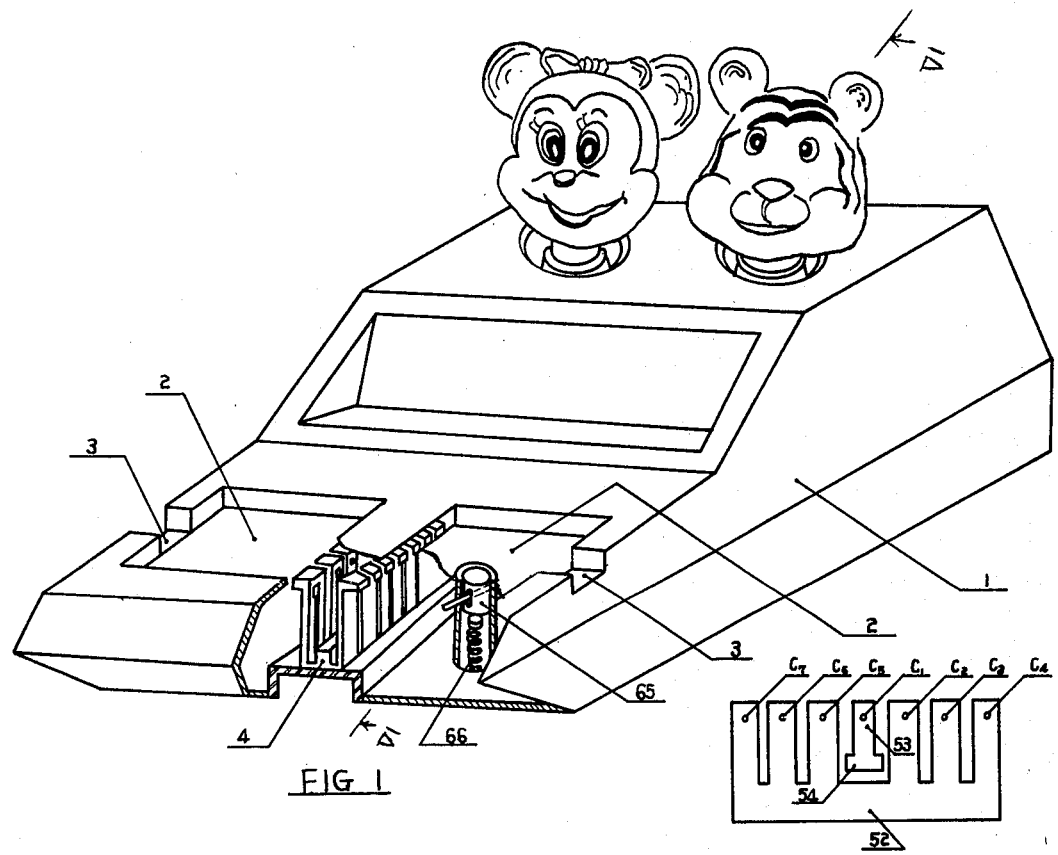
FIG. 1 is a partial cut away perspective view of the educational toy according to the present invention.

Now, with reference to FIG. 1, the frame 1 has a general rectangular configuration formed with a higher stepped rear portion. At the lower front portion, there are two recessed compartments 2 on the top surface, one of which is marked with "Quiz" for receiving a quiz board and the other with "Answer" for an answer board. Both boards will be described later with reference to FIG. 6. The respective compartment has a notch 3 along its outer edge for readily receiving and removing the said board.

Figure 2:
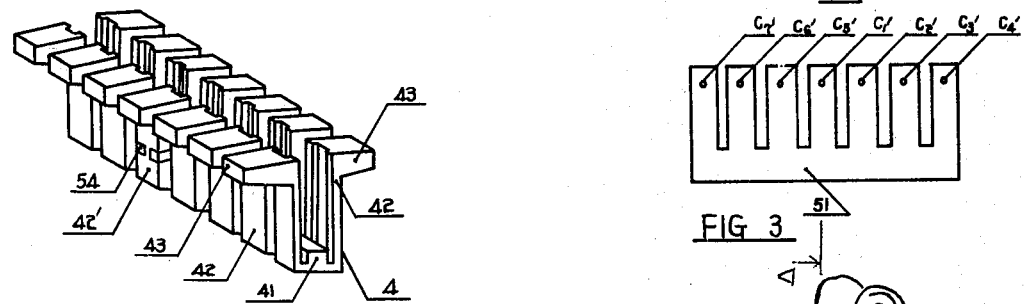
FIG. 2 is a perspective view of the channel bar.

Beneath the intermediate portion between the two compartments is installed a channel like bar 4, as best seen from FIG. 2. The channel bar 4 comprises a base 41 and a plurality of upright stems 42 with heads 43 in two rows provided along opposite longitudinal sides of said base 41. The heads 43 are exposed to said compartments 2 in the manner accessible to the quiz and answer boards as will be described later.

Figure 3:
FIG. 3 is plan view of the conductive plates.

A comb-like conductive plate 51, as shown in FIG. 3, is attached inside of one row, such as at the right-hand side of the FIG. 2 of said upright stems 42 extending to the uppermost top edge of said heads 43. The attachment of said plate 51 can be carried out by inserting into a groove longitudinally along the base 41. And another conductive plate 52 is similarly attached at another row. The only difference between the plate 52 and the first plate 51 is that one of the comb teeth, for example that designated with 53, is separated from the others. The independent plate 53 has extended ears 54 for gripping on the corresponding stem, for example, that designated with 42'. Each comb-tooth of the aforementioned plates 51, 52 and 53 serves as an electrical contact. Alternatively, the stems 42 with head 43 themselves may be made of conductive material, so that additional conductive plates 51, 52 and 53 will not be needed. And in this case, one of the stems 42, such as 42', should be independent from the others.

Figure 7:
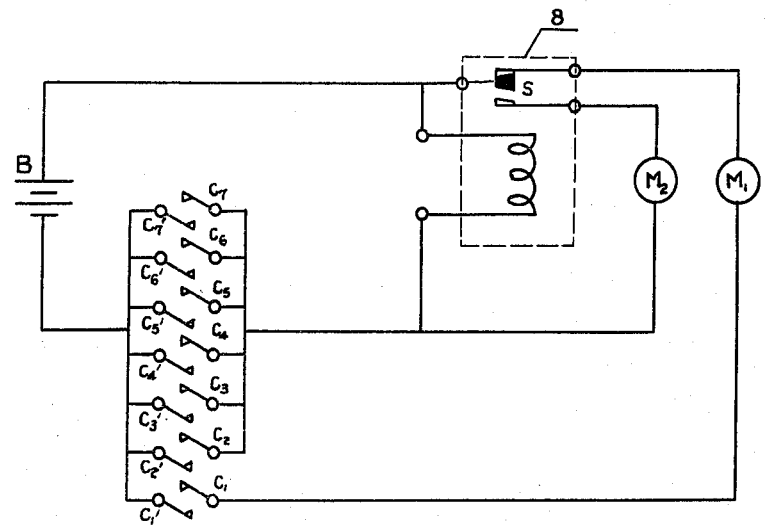
FIG. 7 is an electrical circuit embodiment of the present invention.

Now, referring to FIG. 7, the contact C1 of the independent plate 53 is electrically connected to a motor M1 and the other contacts C2 to C7 of plate 52 to another motor M2. On the other hand, all contacts C1'-C' of the first plate 51 are parallelly connected to a power source, such as battery B.

Figure 4:
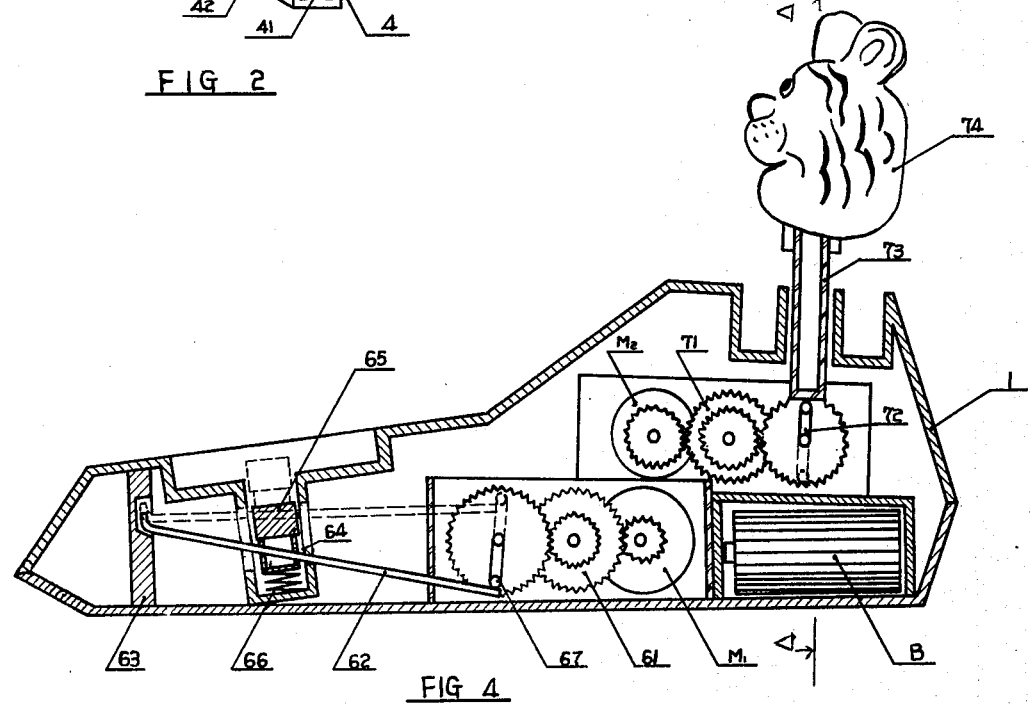
FIG. 4 is a longitudinal cross-section taken along line VI—VI of FIG. 1.

The motor M1 represents the first mechanism including a reduction gear set 61 driven thereby and a lever 67 and a rod 62, as shown in FIG. 4. Said lever 67 is secured at the center of the last gear of said gear set 61. The rod 62 is at one end pivotably secured to a support 63, and its free end passes through a housing 64 and then through the central hole of a ram 65 contained in said housing 64, and terminates at a distance to be depressed by said lever 67. A compressible spring coil 66 is provided within said housing 64 and beneath said ram 65. The housing 64 is opened at the top to the compartment 2 market with "answer". See also to FIG. 1.

Figure 5:
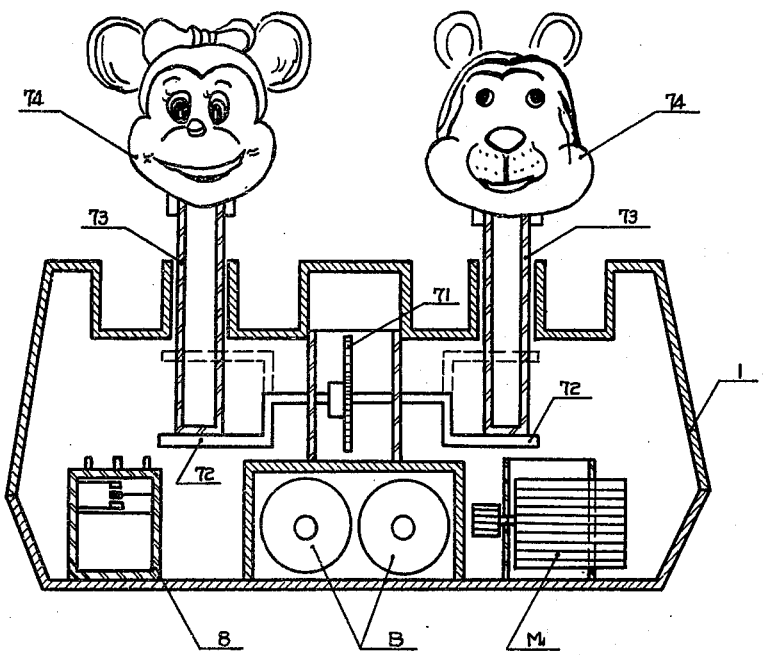
FIG. 5 is a transverse cross-section taken along line V—V of FIG. 4.

The motor M2 represents the second mechanism including another reduction gear set 71 driven thereby and a crank shaft 72, as shown in FIGS. 4 and 5. Said crank shaft 72 extends along both directions and actuates two columns 73 up and down the columns passing through top openings provided on the higher stepped rear portion of the frame structure 1 and bearing toy figures 74. A relay 8 is provided and connected in the circuit clearly as shown in FIG. 7. The electrical wire connections for the relay 8 is omitted in FIG. 5.

Figure 6:
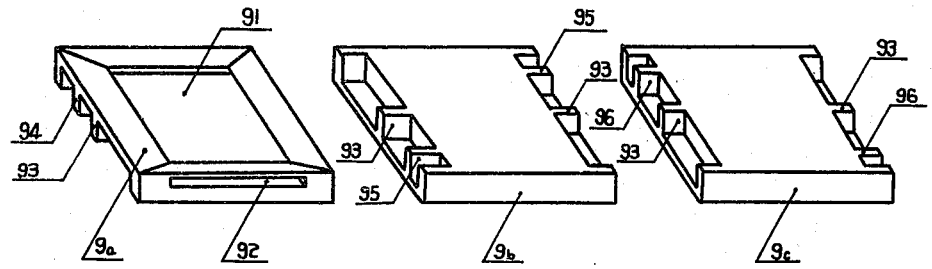
FIG. 6 is a perspective view of representative quiz and answer boards.

Now, as shown in FIG. 6, the quiz and corresponding answer boards 9a to 9c have generally the same configuration. Each board is formed at the top surface with a respective central recess 91, for receiving a replaceable card (not shown) having any quiz or answer designation, respectively, in the form of an illustration, mathematical calculation or other expression. The card can be inserted or removed through the opening 92. The boards 9b and 9c are illustrated as back side up. The difference between the boards 9a to 9c is that the location of the up-side-down symmetrical ribs along opposite edges of each board is varied except the only one unvariable rib 93 which is identical in the central position of all boards as illustrated. For accumodating the embodiment of seven contacts as shown in FIGS. 2 and 7, the edge of the board may be divided into up and down sections by said rib 93. And each section is further divided into there equispaced locations. In addition to the rib 93, a second rib can be formed at any location, such as rib 94 at up second location, rib 95 at an up first and rib 96 at down third location and so on. In this way, there will be six boards having said second rib at different locations. One set of six boards may be used as quiz boards and another set of six boards having identical construction to said one set may be used as answer boards.

In operation, when one places a quiz board 9 on the compartment 2 marked with "quiz" to give a question, the player then selects a corresponding answer board to place on the compartment 2 marked with "answer". Actually, the quiz and answer boards have been inserted with the predeterminate quiz and answer card in accordance with the correct combination of the said second ribs location. As, as soon as the quiz board is set in place, the unvariable rib 93 would press the head 43 of the stem 42' and the second rib presses the head 43 of corresponding stem 42 inwards to one-half of the distance between a pair of heads on opposite sides without contacting the counterpart. In similar manner, when the selective answer board 9 is set in place, the unvariable rib 93 also presses the head 43 of the middle stem 42 just opposite the stem 42' inwards also one-half of said distance, so as to make the contacts C1 and C1' closed. If the answer is negative, namely the second rib on said selective answer board has a different location from that on said quiz board, said second rib would press the head 43 of the stem 42 at a different position from that pressed by said quiz board. In this case, all contacts C2 to C7 and C2' to C7' remain open. In other words, the motor M1 will be actuated while motor M2 stands still. The motor M1 drives the first mechanism into action, in which the gear set 61 makes the lever 67 moved up and down. When the lever 67 moves down it presses down the rod 62 to depress the spring 66, as shown in FIG. 4. When the lever 67 further turns counterclockwise to release the rod 62, then the spring 66 will restore and push the ram 65 up, which in turn pushes the answer board 9 up and rejects the same out of the corresponding compartment 2 by means of the resilience of said stems 42. Then the contacts C1 and C1' disconnect from each other and the answer board should be removed and changed to a new one.

On the contrary, if the answer is affirmative, namely the second rib on said selective answer board has the same location as that on said quiz board, then both heads 43 of the stems 42 at the identical position along opposite edges of the channel bar 4 are pressed to make corresponding one pair of the contracts C2 to C7 and C2' to C7' closed. In this case, the relay 8 is actuated and the switch S shifts to the lower side to actuate motor M2 whereas no action of the motor M1 takes place. The motor M2 drives the second mechanism into action, in which the gear set 71 turns the crank shaft 72 to make the toy figure jump up and down.

The above embodiments are given only for illustration and not by way of limitation, and modifications will become evident to those skilled in the art which will fall within the scope of the attached claims.

What I claim is:

1. An educational toy comprising a frame structure, two compartments provided on the surface of said frame structure, a series of selected quiz and answer boards, one compartment for receiving said quiz boards and the other compartment for receiving said answer boards, a bar disposed beneath said compartments comprising a base and a plurality of flexible upright stems disposed in two rows along opposite longitudinal sides of said base having heads exposed to said compartments and accessible to the quiz and answer boards placed therein, ejecting means for ejecting an answer board from said other compartment to signify the answer is negative and indicating means for showing that an answer is affirmative, separate electrically operated means for individually actuating said ejecting and indicating means, electrical contacts on said stems and electrical circuitry connecting said contacts and said separate electrically operated means, and means on said quiz and answer boards for flexing said stems when inserted in said compartments for selectively closing said contacts to activate one of said separate electrically operated means.

2. An educational toy according to claim 1 wherein said electrical contacts comprise a comb-like conductive plate attached to the row of stems along one longitudinal side of said base, and another comb-like conductive plate attached to the stems of the row along the other longitudinal side of said base, said plates facing each other and extending to the top edges of said heads, and one of the comb teeth being separately and independently attached to one of said stems.

3. An educational toy according to claim 1, wherein said ejecting means comprises a ram located beneath said other compartment.

4. An educational toy according to claim 1, wherein said indicating means comprises at least one toy figure and there are means for moving said figure up and down.

5. An educational toy according to claim 1, wherein said separate electrically operated means comprises separate electric motors, and a relay is provided in said circuitry to interchange the action of said ejecting means and indicating means.

6. An educational toy according to claim 1, wherein each board is formed at its top surface with a central recess for receiving a replaceable card.

7. An educational toy according to claim 1, wherein said means for flexing said stems on each board comprises at least two ribs projecting outwardly along at least one edge thereof, one of the ribs being located at an unvariable identical location for each board and the other of the ribs being located at a different location so as to have a distinguished combination.

* * * * *